United States Patent Office 2,841,620
Patented July 1, 1958

2,841,620

UNSATURATED TERTIARY ETHERS AND PREPARATION THEREOF

Louis Joseph Colaianni, Waldwick, and Martin Louis Tanzer, West Milford Township, Passaic County, N. J., assignors to Hoffmann-La Roche Inc., Nutley, N. J., a corporation of New Jersey No Drawing. Application August 13, 1956
Serial No. 603,799

13 Claims. (Cl. 260—611)

This invention relates to novel chemical processes and novel chemical compounds. More particularly, the invention relates to methods of making ethers; it relates further to intermediates employed in said methods.

In one comprehensive embodiment, the invention provides a process of making ethers which comprises reacting a ketone having the formula (I) 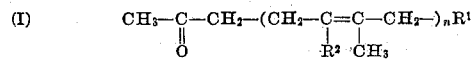

with alkali metal acetylide, thereby producing a compound having the formula (II) 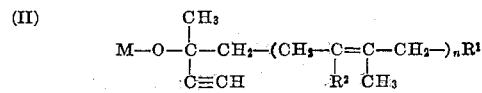

reacting the latter with a compound having the formula (III) 

thereby producing a compound having the formula (IV) 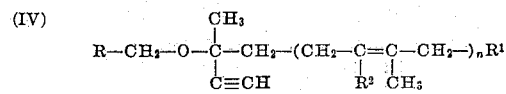

and reacting the latter with about one molar proportion of elemental hydrogen in the presence of a selective hydrogenation catalyst which preferentially catalyzes the hydrogenation of acetylenic unsaturation to the olefinic stage only, thereby producing a compound having the formula (V) 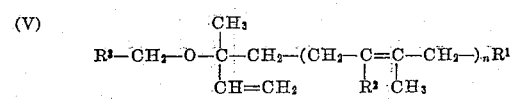

wherein, in the foregoing formulas, each of $R^1$ and $R^2$ represents a member selected from the group consisting of hydrogen and lower alkyl radicals, each of $R^3$ and R represents a member selected from the group consisting of hydrogen and hydrocarbon radicals having not more than six carbon atoms, M represents an alkali metal, A represents an anion of a strong mineral acid, and $n$ represents an integer selected from the series 1, 2.

In the above formulas, illustrative values of $R^1$ and $R^2$ include hydrogen, methyl, ethyl, isobutyl and the like; illustrative values of $R^3$ and R include hydrogen, methyl, ethyl, amyl, allyl, propargyl, phenyl and the like; illustrative values of M include sodium, potassium, lithium and the like; and illustrative values of A include chloride, bromide, iodide, sulfate (half mol) and the like.

In the first stage of the comprehensive embodiment of the invention referred to above, the ketone starting material, Formula I, is condensed with an alkali metal acetylide, thereby yielding the alkali metal oxide compound, Formula II. A convenient mode of execution for this stage of the process comprises dissolving the alkali metal in liquid ammonia, saturating the resulting solution with acetylene until the formation of alkali metal acetylide is complete, and then reacting the thus obtained liquid ammonia solution of alkali metal acetylide with the ketone. The latter is advantageously dissolved in an inert solvent, e. g. toluene or diethyl ether, before being added to the alkali metal acetylide. The product (II) is not isolated, but the solution thereof is used directly in the next stage of the process.

In said next stage, the alkali metal oxide compound of Formula II is reacted with an etherifying reagent, Formula III, thereby forming the acetylenic ether of Formula IV. A convenient mode of execution of this stage of the process comprises introducing the compound (III), either as such or dissolved in an inert solvent, such as diethyl ether or toluene, to the solution of the alkali metal oxide compound (II), while stirring. If desired, the liquid ammonia can be evaporated from the solution of (II) before reaction with the compound (III). Also, if desired, the solution of the compound (II) can be added to the solution of the compound (III), instead of vice versa as indicated above. In order to insure completion of the etherification reaction, the mixture of the reactants is heated at least in the terminal stages of the reaction.

In the third stage of the comprehensive embodiment of the invention referred to above, the acetylenic ether, Formula IV, is partially hydrogenated, in order to reduce the acetylenic linkage to an olefinic linkage. This partial hydrogenation is conveniently effected by catalytic hydrogenation of the acetylenic ether of Formula IV in the presence of a selective hydrogenation catalyst. Selective hydrogenation catalysts useful in practicing the invention, i. e. those which have a preferential tendency to catalyze the reduction of acetylenic bonds only so far as to olefinic bonds, are well known to those skilled in the art. Illustrative catalysts of this type are disclosed, for example, by Lindlar, in Helvetica Chimica Acta, 35, 446 (1952) and U. S. Patent 2,681,938. A preferred catalyst for use in practicing the processes of the invention is the palladium-on-calcium carbonate catalyst, upon which metallic lead has been deposited, specifically disclosed by Lindlar at page 450 of his cited publication. When employing the preferred Lindlar catalyst above referred to, it suffices to mix the acetylenic ether, Formula IV, dissolved in an inert solvent such as petroleum ether or other similar hydrocarbon solvent, with elemental hydrogen supplied at a moderate hydrogen overpressure, such as from about 2 to about 5 p. s. i. gauge; in the presence of a small amount, e. g. from about 1% to about 15% by weight (calculated upon the basis of the acetylenic compound to be hydrogenated), of the selective hydrogenation catalyst; at about room temperature; until the uptake of hydrogen ceases.

The ethers of Formula V above are useful in perfumery, for example as odorants in the compounding of perfumes and of other scented compositions, by virtue of their fine fragrance.

The ethers of Formula IV above are also useful in perfumery, for example as odorants in the preparation of perfumes and of other scented compositions. The ethers of Formula IV possess characteristic fine odors, which, however, are specifically distinguishable from the odors of their hydrogenated analogs of Formula V.

It will thus be seen that one important aspect of the invention relates to a process which comprises reacting a compound having the formula

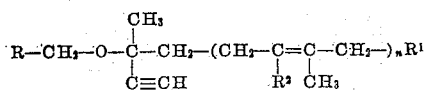

with about one molar proportion of elemental hydrogen in the presence of a selective hydrogenation catalyst which preferentially catalyzes the hydrogenation of acetylenic unsaturation to the olefinic stage only; wherein, in the foregoing formula, each of $R^1$, $R^2$, R and n has the same meaning indicated above.

Still another important aspect of the invention relates to novel compounds having the formula

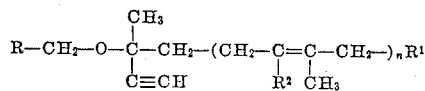

wherein $R^1$, $R^2$, R and n have the same meanings indicated above.

A third important aspect of the invention relates to a process which comprises reacting a compound having the formula

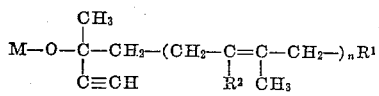

with a compound having the formula

thereby producing a compound having the formula

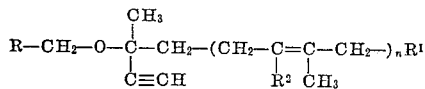

wherein $R^1$, $R^2$, R, M, A and n have the same meanings indicated above.

The ketones of Formula I above used as starting materials in the comprehensive processes of the invention are not generically novel. Below is described the preparation of certain of these ketones, the description of which is not contained in any generally accessible printed publication: this subject matter is not claimed as part of the present invention.

PREPARATION OF 6-METHYL-5-OCTEN-2-ONE 600 g. of 3-methyl-1-penten-3-ol was cooled to +15° C. with an ice bath, then 1800 cc. of concentrated aqueous hydrochloric acid (37%) was poured into the reaction vessel. The mixture was stirred for thirty minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph was added from a separatory funnel in two hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° C./10 mm., $n_D^{25} = 1.4412$.

PREPARATION OF 6,8-DIMETHYL-5-NONEN-2-ONE 438 grams of 3,5-dimethyl-1-hexen-3-ol was stirred with 1500 cc. of concentrated aqueous hydrochloric acid (37% by weight HCl concentration) at room temperature for thirty minutes. The oil layer was separated, washed twice, each time with 500 cc. of water, and dried over calcium chloride. The product obtained, 1-chloro-3,5-dimethyl-2-hexene, had $n_D^{25} = 1.448$.

In a five-liter flask there was placed three liters of benzene, 429 g. of ethyl acetoacetate and 162 g. of sodium methylate. 428 g. of the product of the preceding paragraph, 1-chloro-3,5-dimethyl-2-hexene, was added at 60° C. within thirty minutes, and stirring was continued for six hours at 60°–70° C. The reaction mixture was washed with two liters of water and the benzene was distilled off under a vacuum of 100 mm. to yield 3-carbethoxy-6,8-dimethyl-5-nonen-2-one as a straw colored oil.

The entire quantity of 3-carbethoxy-6,8-dimethyl-5-nonen-2-one produced in the preceding paragraph was dissolved in 2 liters of ethyl alcohol. To this was added 200 g. of solid potassium hydroxide and 200 cc. of water. The mixture was stirred for four hours at 40°–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with 2 liters of water and the oil layer was removed by means of a separatory funnel. The aqueous portion was extracted with 500 cc. of benzene. The combined oils were washed neutral with water and fractionated. The product, 6,8-dimethyl-5-nonen-2-one distilled at 120° C. at 35 mm., $n_D^{25} = 1.4432$.

The invention is further disclosed in the following examples, which are illustrative but not limitative thereof. Temperatures are stated in degrees centigrade, uncorrected.

Example 1

In a 2-liter, 3-neck flask fitted with a stirrer, solid carbon dioxide condenser, dropping funnel and gas inlet tube, was placed one liter of anhydrous liquid ammonia. 27.6 grams (1.2 mols) of metallic sodium was dissolved in the liquid ammonia, and then acetylene, purified by passage through a solid carbon dioxide trap, was introduced through the gas inlet tube. The addition of acetylene was continued until the color changed from blue to white, indicating complete conversion of the sodium to sodium acetylide. 126 grams of 6-methyl-5-hepten-2-one, dissolved in 150 ml. of toluene, was added dropwise to the liquid ammonia solution of sodium acetylide. The addition of the ketone took place over a period of one hour, and the resulting mixture was stirred for 15 hours. The ammonia was then removed by heating the reaction mixture. The dropping funnel was replaced with a thermometer, and when the internal temperature of the reaction mixture reached 20°, methyl bromide gas was bubbled in through the gas inlet tube. The addition of methyl bromide was continued, while stirring the reaction mixture, until a total of 190 g. of the bromide was taken up by the reaction mixture. Then 250 ml. of water was added to the reaction mixture, in order to dissolve sodium bromide formed in the reaction. The organic layer was separated and washed twice, each time with 50 ml. of water. The combined water layer and washes were extracted with 50 ml. of toluene; the toluene extract and the previously separated organic layer were combined; and the combined liquors were concentrated. The crude concentrate was fractionally distilled, yielding 3,7-dimethyl-3-methoxy-6-octen-1-yne, B. P. 68°/7 mm., $n_D^{25} = 1.4462$. This material had a pleasant odor reminiscent of bergamot.

Example 2

In similar manner to the preceding example, 55.5 g. of sodium in one liter of liquid ammonia was completely reacted with acetylene, and to the resulting liquid ammonia solution of sodium acetylide was added, over a period of two hours, and while stirring, a solution of 252 g. of 6-methyl-5-hepten-2-one in 300 ml. of toluene. The reaction mixture was stirred for 15 hours longer. The liquid ammonia was then removed by evaporation, and to the residual mixture at 10° was added dropwise, over a period of four hours, and while stirring, a solution of 327 g. of ethyl bromide in 150 ml. of toluene. Stirring was continued for 15 hours longer at 10°, then the mixture was warmed to 25° and stirred three hours longer at that temperature. The reaction mixture was then poured into ice water and worked up as indicated in the preceding example. There was thus obtained 3,7-dimethyl-3-ethoxy-6-octen-1-yne, B. P. 40°/0.3 mm., $n_D^{25}=1.4478$. This material has a pleasant fragrance reminiscent of bergamot.

Example 3

55.2 g. of sodium dissolved in one liter of liquid ammonia was reacted with acetylene in the manner indicated in Example 1. To the resulting solution of sodium acetylide was added a solution of 252 g. of 6-methyl-5-hepten-2-one in 300 ml. of toluene. The liquid ammonia was evaporated, and the residual solution was added dropwise, and while stirring, over a period of five and one-half hours, to a hot (100°) solution of 434 g. of n-amyl bromide. The mixture was stirred for 15 hours, without additional heat. The reaction mixture was then worked up in the manner indicated in Example 1, yielding 3,7-dimethyl-3-n-amyloxy-6-octen-1-yne, B. P. 67°–69°/0.25 mm., $n_D^{25}=1.4471$. This material had a pleasant fragrance reminiscent of jasmine.

Example 4

In the same manner indicated in Example 1, 55 g. of sodium in one liter of liquid ammonia was reacted with acetylene to form sodium acetylide, and the latter product was reacted with 252 g. of 6-methyl-5-hepten-2-one dissolved in 300 ml. of toluene. The liquid ammonia was evaporated, and to the residual mixture at 23° was added dropwise, over a period of two hours, while stirring, a solution of 360 g. of allyl bromide in 100 ml. of toluene. The reaction mixture was stirred overnight and the product was worked up in the manner indicated in Example 1. There was thus obtained 3,7-dimethyl-3-allyloxy-6-octen-1-yne, B. P. 58°/1 mm., $n_D^{25}=1.4563$. This material had a pleasant odor reminiscent of jasmine but with a fruity note.

Example 5

23 g. of sodium dissolved in one liter of liquid ammonia was reacted with acetylene in the manner indicated in Example 1. To the resulting solution of sodium acetylide was added a solution of 126 g. of 6-methyl-5-hepten-2-one in 150 ml. of diethyl ether. To the liquid ammonia-ether solution at minus 33° was added dropwise, and while stirring, over a period of two hours, a solution of 238 g. of propargyl bromide in 250 ml. of diethyl ether. The mixture was stirred for 15 hours, then the liquid ammonia was evaporated. The reaction mixture was then worked up in the manner indicated in Example 1, yielding 3,7-dimethyl-3-propargyloxy-6-octen-1-yne, B. P. 45°/0.2 mm., $n_D^{25}=1.4639$. This material had an odor reminiscent of bois de rose.

Example 6

To a solution prepared by reacting 13.8 g. of sodium, dissolved in 250 ml. of liquid ammonia, with acetylene, was added a solution of 63 g. of 6-methyl-5-hepten-2-one in 60 ml. of toluene. After reaction of the ketone, the liquid ammonia was evaporated, and to the residual mixture at 25° was added 128 g. of benzyl bromide over a period of one and one-half hours. The reaction mixture was stirred 24 hours at room temperature and it was worked up in the manner indicated in Example 1. There was thus obtained 3,7-dimethyl-3-benzyloxy-6-octen-1-yne, B. P. 102°/0.2 mm., $n_D^{25}=1.5095$. This material had a soft cinnamon odor.

Example 7

In the manner indicated in Example 1, 55 g. of sodium in one liter of liquid ammonia was completely reacted with acetylene, and to the resulting solution of sodium acetylide was added a solution of 280 g. of 5,6-dimethyl-5-hepten-2-one in 400 ml. of diethyl ether. The ketone was completely reacted, the liquid ammonia was then evaporated, and methyl bromide gas was bubbled into the residual mixture at 25°, while stirring, until a total of 285 g. of methyl bromide was absorbed by the solution. The reaction mixture was worked up in the manner indicated in Example 1, yielding 3,6,7-trimethyl-3-methoxy-6-octen-1-yne, B. P. 78°/8 mm., $n_D^{25}=1.4542$. This material had an odor reminiscent of myristica.

Example 8

In the manner indicated in Example 1, 55 g. of sodium in one liter of liquid ammonia was reacted with acetylene, and the resulting solution of sodium acetylide was reacted with a solution of 280 g. of 6-methyl-5-octen-2-one in 300 ml. of diethyl ether. The liquid ammonia was then evaporated, and to the residual solution at 15° was added methyl bromide gas, in the manner indicated in Example 1, until a total weight of 285 g. of methyl bromide had been absorbed by the solution. The reaction mixture was then worked up in the manner indicated in Example 1, yielding 3,7-dimethyl-3-methoxy-6-nonen-1-yne, B. P. 78°/6 mm., $n_D^{25}=1.4497$. This material had an odor reminiscent of bois de rose.

Example 9

46 g. of sodium dissolved in one liter of liquid ammonia was reacted with acetylene in the manner indicated in Example 1. To the resulting solution of sodium acetylide was added a solution of 224 g. of 6-methyl-5-octen-2-one in 300 ml. of diethyl ether. The liquid ammonia was evaporated, and to the residual solution at 20° was added dropwise, and while stirring, over a period of two hours, 262 g. of ethyl bromide. The mixture was stirred for 15 hours, at 20°, and then the reaction mixture was worked up in the manner indicated in Example 1, yielding 3,7-dimethyl-3-ethoxy-6-nonen-1-yne, B. P. 47°/0.3 mm., $n_D^{25}=1.4502$. This material had an odor reminiscent of estragon.

Example 10

In the manner indicated in Example 1, 69 g. of sodium in one liter of liquid ammonia was completely reacted with acetylene, and the resulting solution of sodium acetylide was reacted with a solution of 420 g. of 6,8-dimethyl-5-nonen-2-one in 400 ml. of toluene. The liquid ammonia was then evaporated, and to the resulting solution at 18° was added methyl bromide gas, in the manner indicated in Example 1, until a total weight of 285 g. of methyl bromide had been absorbed by the solution. The reaction mixture was worked up in the manner indicated in Example 1, yielding 3,7,9-trimethyl-3-methoxy-6-decen-1-yne, B. P. 66°/0.6 mm., $n_D^{25}=1.4501$. This material had a balsamic odor.

Example 11

In the manner indicated in Example 1, 41.5 g. of sodium in one liter of liquid ammonia was completely reacted with acetylene and the resulting solution of sodium acetylide was reacted with a solution of 252 g. of 6,8-dimethyl-5-nonen-2-one in 300 ml. of toluene. The liquid ammonia was then evaporated and the residual solution was added dropwise, over a period of four hours, and while stirring, to a solution of 270 g. of allyl bromide in 100 ml. of toluene heated to 50°. After completion of the addition, the reaction mixture was stirred for 15 hours at 25°. The reaction mixture was worked up in the manner indicated in Example 1, yielding 3,7,9-trimethyl-3-allyloxy-6-decen-1-yne, B. P. 72°/0.8 mm., $n_D^{25}=1.4583$. This material had an odor reminiscent of galbanum.

Example 12

In the manner indicated in Example 1, 55.2 g. of sodium in one liter of liquid ammonia was reacted with acetylene, and the resulting solution of sodium acetylide was reacted with 388 g. of 6,10-dimethyl-5,9-undecadien-2-one (geranyl acetone) in 400 ml. of diethyl ether. The liquid ammonia was then evaporated and to the residual solution, at 15°, was added methyl bromide gas, in the manner indicated in Example 1, until a total weight of 285 g. of methyl bromide had been absorbed by the solution. The reaction mixture was then worked up in the manner indicated in Example 1, yielding 3,7,11-trimethyl-3-methoxy-6,10-dodecadien-1-yne, B. P. 91°/0.7 mm., $n_D^{25}=1.4684$. This material had an odor reminiscent of lily.

Example 13

In the manner indicated in Example 1, 13.8 g. of sodium in 500 ml. of liquid ammonia was completely reacted with acetylene, and to the resulting solution of sodium acetylide was added a solution of 97.1 g. of 6,10-dimethyl-5,9-undecadien-2-one (geranyl acetone) in 200 ml. of diethyl ether. The ketone was completely reacted, the liquid ammonia was then evaporated, and 121 g. of allyl bromide was added dropwise over a period of 40 minutes, while stirring. Stirring was continued for a period of 60 hours at 25°. The reaction mixture was worked up in the manner indicated in Example 1, yielding 3,7,11 - trimethyl - 3 - allyloxy - 6,10 - dodecadien-1-yne, B. P. 96°/0.6 mm., $n_D^{25}=1.4757$. This material had an odor reminiscent of lily, but with a fruity note.

Example 14

In a 3-liter, 3-neck flask equipped with a sealed stirrer, hydrogen inlet tube and thermometer was placed 160.5 g. of 3,7-dimethyl-3-methoxy-6-octen-1-yne, 200 ml. of petroleum naphtha (boiling range 60°–72°) and 10 g. of a 5% palladium-on-calcium carbonate catalyst, modified by deposition of lead thereon, as specifically disclosed by Lindlar, Helvetica Chimica Acta 35, 450 (1952). The hydrogenator was flushed with nitrogen, then with hydrogen. When a leak-proof system was established, the stirrer was started and hydrogen was introduced under a pressure of 7 to 10 inches of water, until the uptake of hydrogen ceased. The catalyst was filtered away from the petroleum naphtha solution, and the solvent was removed by flash distillation through a short Vigreux column. The residue was fractionated, yielding 3,7-dimethyl-3-methoxy - 1,6 - octadiene, B. P. 84.5°/15 mm., $n_D^{25}=1.4482$. This material had a pleasant fragrance reminiscent of bergamot.

Example 15

In the same manner indicated in Example 14, 92 g. of 3,7-dimethyl-3-ethoxy-6-octen-1-yne, dissolved in 184 ml. of n-hexane and in the presence of 4.6 g. of 5% palladium-on-calcium carbonate catalyst, modified by deposition of lead (identified in Example 14), was reacted with hydrogen until no further hydrogen was taken up. The reaction mixture was worked up in the manner indicated in Example 14, yielding 3,7-dimethyl-3-ethoxy-1,6-octadiene, B. P. 42°/0.3 mm., $n_D^{25}=1.4458$. This material had a bergamot odor.

Example 16

In the same manner indicated in Example 14, 92 g. of 3,7-dimethyl - 3 - allyloxy-6-octen-1-yne, dissolved in 184 ml. of n-hexane, and in the presence of 4.6 g. of 5% palladium-on-calcium carbonate catalyst, modified by deposition of lead (same catalyst identified in Example 14), was reacted with hydrogen until no further hydrogen was taken up. The reaction mixture was worked up in the manner indicated in Example 14, yielding 3,7-dimethyl-3-allyloxy - 1,6 - octadiene, B. P. 46°/0.2 mm., $n_D^{25}=1.4535$. This material had a jasmine odor.

Example 17

In the same manner indicated in Example 14, 118 g. of 3,7-dimethyl-3-benzyloxy-6-octen-1-yne, dissolved in 240 ml. of petroleum naphtha (boiling range 60°–72°) and in the presence of 6.0 g. of 5% palladium-on-calcium carbonate catalyst modified by deposition of lead (same catalyst as in Example 14), was reacted with hydrogen until no further hydrogen was taken up. The reaction mixture was worked up in the manner indicated in Example 14, yielding 3,7-dimethyl - 3 - benzyloxy-1,6-octadiene, B. P. 101°/0.2 mm., $n_D^{25}=1.5094$. This material had a fragrance reminiscent of cinnamon.

Example 18

In the same manner indicated in Example 14, 100 g. of 3,7-dimethyl-3-n-amyloxy-6-octen-1-yne, dissolved in 200 ml. of petroleum naphtha (boiling range 60°–72°), and in the presence of 3.0 g. of 5% palladium-on-calcium carbonate catalyst modified by deposition of lead (same catalyst as in Example 14), was reacted with hydrogen until no further hydrogen was taken up. The reaction mixture was worked up in the manner indicated in Example 14, yielding 3,7-dimethyl-3-n-amyloxy - 1,6 - octadiene, B. P. 73°/0.3 mm., $n_D^{25}=1.4473$. This material had an odor reminiscent of jasmine.

Example 19

In the same manner indicated in Example 14, 134 g. of 3,6,7-trimethyl-3-methoxy-6-octen-1-yne, dissolved in 134 ml. of petroleum naphtha (boiling range, 60°–72°), and in the presence of 13.4 g. of 5% palladium-on-calcium carbonate catalyst modified by deposition of lead (same catalyst as in Example 14), was reacted with hydrogen until no further hydrogen was taken up. The reaction mixture was worked up in the manner indicated in Example 14, yielding 3,6,7-trimethyl-3-methoxy-1,6-octadiene, B. P. 62°/0.35 mm., $n_D^{25}=1.4544$. This material had a myristica odor.

Example 20

In the same manner indicated in Example 14, 138.6 g. of 3-methoxy-3,7-dimethyl-6-nonen-1-yne, dissolved in 140 ml. of petroleum naphtha (boiling range, 60°–72°), and in the presence of 7.0 g. of 5% palladium-on-calcium carbonate catalyst modified by deposition of lead (same catalyst identified in Example 14), was reacted with hydrogen until no further hydrogen was taken up. The reaction mixture was worked up in the manner indicated in Example 14, yielding 3-methoxy-3,7-dimethyl-1,6-nonadiene, B. P. 68°/1.6 mm., $n_D^{25}=1.4495$. This material had a fragrance reminiscent of bois de rose.

Example 21

In the same manner indicated in Example 14, 297.1 g. of 3-methoxy-,3,7,9-trimethyl-6-decen-1-yne, dissolved in 300 ml. of petroleum naphtha (boiling range, 60°–72°), and in the presence of 30 g. of 5% palladium-on-calcium carbonate catalyst modified by deposition of lead (same catalyst identified in Example 14), was reacted with hydrogen until no further hydrogen was taken up. The reaction mixture was worked up in the manner indicated in Example 14, yielding 3-methoxy-3,7,9-trimethyl-1,6-decadiene, B. P. 108°–109°/7 mm., $n_D^{25}=1.4550$. This material had a balsamic odor.

Example 22

In the same manner indicated in Example 14, 75.3 g. of 3-allyloxy-3,7,9-trimethyl-6-decen-1-yne, dissolved in 75 ml. of petroleum naphtha (boiling range 60°–72°), and in the presence of 1.9 g. of 5% palladium-on-calcium carbonate catalyst modified by deposition of lead (same catalyst identified in Example 14) was reacted with hydrogen until no further hydrogen was taken up. The reaction mixture was worked up in the same manner indicated in Example 14, yielding 3-allyloxy-3,7,9-trimethyl-1,6-decadiene, B. P. 89°/1.2 mm., $n_D^{25}$=1.4552. This material had a galbanum odor.

*Example 23*

In the same manner indicated in Example 14, 144.2 g. of 3-methoxy-3,7,11-trimethyl-1,6-dodecadien-1-yne, dissolved in 145 ml. of petroleum naphtha, B. R. 60°–72°, and in the presence of 14.5 g. of 5% palladium-on-calcium carbonate catalyst modified by deposition of lead (same catalyst identified in Example 14), was reacted with hydrogen until no further hydrogen was taken up. The reaction mixture was worked up in the manner indicated in Example 14, yielding 3-methoxy-3,7,11-trimethyl-1,6,10-dodecatriene, B. P. 110°/0.70 mm., $n_D^{25}$=1.4678. This material had a lily fragrance.

*Example 24*

In the same manner indicated in Example 14, 73.6 g. of 3-propargyloxy-3,7-dimethyl-6-octen-1-yne dissolved in 100 ml. of n-hexane, and in the presence of 4.0 g. of the same 5% palladium-on-calcium carbonate catalyst modified by deposition of lead (same catalyst identified in Example 14), was reacted with hydrogen until no further hydrogen was taken up. The reaction mixture was worked up in the manner indicated in Example 14, yielding 3-allyloxy-3,7-dimethyl-1,6-octadiene, i. e. the same product obtained in Example 16.

We claim:

1. A process which comprises reacting a ketone having the formula

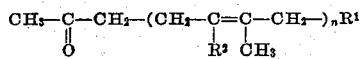

with alkali metal acetylide, thereby producing a compound having the formula

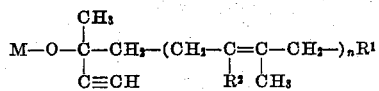

reacting the latter with a compound having the formula

thereby producing a compound having the formula

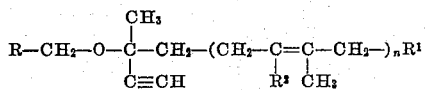

and reacting the latter with about one molar proportion of elemental hydrogen in the presence of a selective hydrogenation catalyst which preferentially catalyzes the hydrogenation of acetylenic unsaturation to the olefinic stage only, thereby producing a compound having the formula

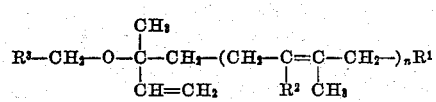

wherein, in the foregoing formulas, each of $R^1$ and $R^2$ represents a member selected from the group consisting of hydrogen and lower alkyl radicals, each of $R^3$ and R represents a member selected from the group consisting of hydrogen and hydrocarbon radicals having not more than six carbon atoms, M represents an alkali metal, A represents an anion of a strong mineral acid, and $n$ represents an integer selected from the series 1, 2.

2. A compound having the formula

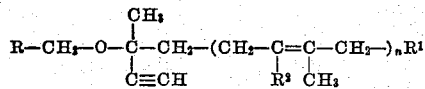

wherein each of $R^1$ and $R^2$ represents a member selected from the group consisting of hydrogen and lower alkyl radicals, R represents a member selected from the group consisting of hydrogen and hydrocarbon radicals having not more than six carbon atoms, and $n$ represents an integer selected from the series 1, 2.

3. A process which comprises reacting a compound having the formula

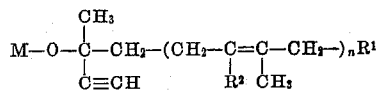

with a compound having the formula

R—CH₂—A thereby producing a compound having the formula

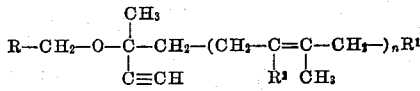

wherein, in the foregoing formulas, each of $R^1$ and $R^2$ represents a member selected from the group consisting of hydrogen and lower alkyl radicals, R represents a member selected from the group consisting of hydrogen and hydrocarbon radicals having not more than six carbon atoms, M represents an alkali metal, A represents an anion of a strong mineral acid, and $n$ represents an integer selected from the series 1, 2.

4. A process of making a compound having the formula

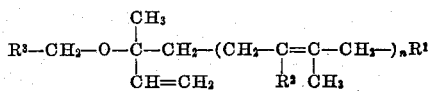

which comprises reacting a compound having the formula

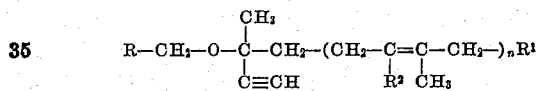

with about one molar proportion of elemental hydrogen in the presence of a selective hydrogenation catalyst which preferentially catalyzes the hydrogenation of acetylenic unsaturation to the olefinic stage only; wherein, in the foregoing formulas, each of $R^1$ and $R^2$ represents a member selected from the group consisting of hydrogen and lower alkyl radicals, each of $R^3$ and R represents a member selected from the group consisting of hydrogen and hydrocarbon radicals having not more than six carbon atoms, and $n$ represents an integer selected from the series 1, 2.

5. 3,7-dimethyl-3-methoxy-6-octen-1-yne.
6. 3,7-dimethyl-3-benzyloxy-6-octen-1-yne.
7. 3,6,7-trimethyl-3-methoxy-6-octen-1-yne.
8. 3,7,9-trimethyl-3-methoxy-6-decen-1-yne.
9. 3,7,9-trimethyl-3-allyloxy-6-decen-1-yne.
10. A lower aliphatic hydrocarbon ether of 3,7-dimethyl-6-octen-1-yn-3-ol.
11. A lower aliphatic hydrocarbon ether of 3,6,7-trimethyl-6-octen-1-yn-3-ol.
12. A lower aliphatic hydrocarbon ether of 3,7,9-trimethyl-6-decen-1-yn-3-ol.
13. 3,7-dimethyl-3-lower alkoxy-6-octen-1-yne.

References Cited in the file of this patent

UNITED STATES PATENTS 2,681,938   Lindlar _____ June 22, 1954

OTHER REFERENCES

Simonsen et al.: The Terpenes, vol. I, 2nd edition, page 61 (1953).

Schinz et al.: Helvetica Chim. Acta, vol. 30, pages 1810–1814 (5 pages), 1947.

Winter et al.: Helv. Chim. Acta, vol. 30, pages 2213–15 (3 pages), 1947.

Surrey: Name Reactions in Organic Chem., 1954, pp. 169–70 (2 pages).